United States Patent
Majjigi et al.

(10) Patent No.: US 9,973,957 B2
(45) Date of Patent: May 15, 2018

(54) APPLICATION DEPENDENT CHANNEL CONDITION ASSESSMENT

(71) Applicant: Apple Inc., Cupertino, CA (US)

(72) Inventors: Vinay R. Majjigi, Sunnyvale, CA (US); Tarik Tabet, Los Gatos, CA (US); Christian W. Mucke, Cupertino, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 457 days.

(21) Appl. No.: 14/488,499

(22) Filed: Sep. 17, 2014

(65) Prior Publication Data
US 2015/0085685 A1    Mar. 26, 2015

Related U.S. Application Data

(60) Provisional application No. 61/882,311, filed on Sep. 25, 2013.

(51) Int. Cl.
*H04W 24/10*    (2009.01)
*H04L 25/02*    (2006.01)

(52) U.S. Cl.
CPC ......... *H04W 24/10* (2013.01); *H04L 25/0202* (2013.01); *H04L 25/0206* (2013.01)

(58) Field of Classification Search
CPC .. H04W 24/10; H04W 4/001; H04L 25/0202; H02L 25/0206
See application file for complete search history.

(56) References Cited

U.S. PATENT DOCUMENTS

| | | | |
|---|---|---|---|
| 2006/0133543 A1* | 6/2006 | Linsky | H04B 1/715 375/341 |
| 2007/0178930 A1* | 8/2007 | Xiao | H04W 52/346 455/522 |
| 2007/0218917 A1 | 9/2007 | Frederiksen et al. | |

(Continued)

FOREIGN PATENT DOCUMENTS

WO    2012109195    8/2012

OTHER PUBLICATIONS

3rd Generation Partnership Project "Technical Specification Group Services and System Aspects; Policy and charging control architecture" 3GPP TS 23.203 V11.0.0, Dec. 2010.*

(Continued)

*Primary Examiner* — Robert M Morlan
(74) *Attorney, Agent, or Firm* — Meyertons Hood Kivlin Kowert & Goetzel, P.C.; Jeffery C. Hood

(57) ABSTRACT

This disclosure relates to application dependent channel condition assessment mode selection for reduced power consumption in cellular communications. In one embodiment, a channel condition assessment mode may be selected for assessing a wireless communication channel used for a cellular link. The channel condition assessment mode may be selected from at least two channel condition assessment modes, and may be selected at least in part based on application characteristics of an application using the cellular link. Channel condition assessment may be performed according to the selected channel condition assessment mode. Channel condition assessment results obtained from the channel condition assessment may be transmitted to a cellular base station via the cellular link.

18 Claims, 6 Drawing Sheets

(56) References Cited

U.S. PATENT DOCUMENTS

| | | |
|---|---|---|
| 2008/0095185 A1* | 4/2008 | DiGirolamo .......... H04L 1/0026 370/464 |
| 2008/0159183 A1* | 7/2008 | Lindoff ................ H04L 1/1664 370/278 |
| 2009/0238250 A1 | 9/2009 | Kangas et al. |
| 2009/0258600 A1 | 10/2009 | Nishio et al. |
| 2009/0268697 A1 | 10/2009 | Jeon et al. |
| 2010/0041412 A1* | 2/2010 | Yu ......................... H04W 24/10 455/450 |
| 2010/0091818 A1 | 4/2010 | Sen et al. |
| 2011/0305154 A1 | 12/2011 | Forck et al. |
| 2012/0087264 A1* | 4/2012 | Lindoff ................ H04L 5/0048 370/252 |
| 2012/0140669 A1* | 6/2012 | Wang ................... H04W 24/06 370/252 |
| 2015/0281020 A1* | 10/2015 | Yun ..................... H04L 43/0864 370/252 |

OTHER PUBLICATIONS

Office Action, Taiwan Application No. 103132674, dated Oct. 14, 2015, 16 pages.
Written Opinion of the International Preliminary Examining Authority, Application No. PCT/US2014/056211, dated Sep. 11, 2015, 7 pages.
International Search Report and Written Opinion from PCT/US2014/056211, dated Dec. 8, 2014, Apple INc., pp. 1-12.

* cited by examiner

| $I_{TBS}$ | $N_{PRB}$ | | | | |
|---|---|---|---|---|---|
| | 1 | 2 | 3 | 4 | 5 |
| 0 | 16 | 32 | 56 | 88 | 120 |
| 1 | 24 | 56 | 88 | 144 | 176 |
| 2 | 32 | 72 | 144 | 176 | 208 |
| 3 | 40 | 104 | 176 | 208 | 256 |
| 4 | 56 | 120 | 208 | 256 | 328 |
| 5 | 72 | 144 | 224 | 328 | 424 |
| 6 | 328 | 176 | 256 | 392 | 504 |
| 7 | 104 | 224 | 328 | 472 | 584 |
| 8 | 120 | 256 | 392 | 536 | 680 |
| 9 | 136 | 296 | 456 | 616 | 776 |
| 10 | 144 | 328 | 504 | 680 | 872 |
| 11 | 176 | 376 | 584 | 776 | 1000 |
| 12 | 208 | 440 | 680 | 904 | 1128 |
| 13 | 224 | 488 | 744 | 1000 | 1256 |
| 14 | 256 | 552 | 840 | 1128 | 1416 |
| 15 | 280 | 600 | 904 | 1224 | 1544 |
| 16 | 328 | 632 | 968 | 1288 | 1608 |
| 17 | 336 | 696 | 1064 | 1416 | 1800 |
| 18 | 376 | 776 | 1160 | 1544 | 1992 |
| 19 | 408 | 840 | 1288 | 1736 | 2152 |
| 21 | 440 | 904 | 1384 | 1864 | 2344 |
| 21 | 488 | 1000 | 1480 | 1992 | 2472 |
| 22 | 520 | 1064 | 1608 | 2152 | 2664 |
| 23 | 552 | 1128 | 1736 | 2280 | 2856 |
| 24 | 584 | 1192 | 1800 | 2408 | 2984 |
| 25 | 616 | 1256 | 1864 | 2536 | 3112 |
| 26 | 712 | 1480 | 2216 | 2984 | 3752 |

UE CQI = 0 (Very Bad, Cannot Decode): rows 0–3

UE CQI = 1 (Bad, Cannot Decode): rows 4–9

UE CQI = 2 (Good, Can Decode): rows 10–16

UE CQI = 3 (Great, Can Decode): rows 17–26

*FIG. 7*

APPLICATION DEPENDENT CHANNEL CONDITION ASSESSMENT

PRIORITY CLAIM

The present application claims benefit of priority to U.S. Provisional Application No. 61/882,311 titled "Application Dependent Channel Condition Assessment" and filed on Sep. 25, 2013, whose inventors are Vinay R. Majjigi, Tarik Tabet, Christian W. Mucke, and Syed A. Mujtaba, which is hereby incorporated by reference in its entirety as though fully and completely set forth herein.

FIELD

The present disclosure relates to wireless devices, and more particularly to a system and method for performing application dependent channel condition assessments.

DESCRIPTION OF THE RELATED ART

Wireless communication systems are rapidly growing in usage. Further, wireless communication technology has evolved from voice-only communications to also include the transmission of data, such as Internet and multimedia content. There now exist numerous different wireless communication technologies and standards. Some examples of wireless communication standards include GSM, UMTS (associated with, for example, WCDMA or TD-SCDMA air interfaces), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of, inter alia, methods for performing channel assessment in a manner that considers application characteristics of an application using that channel for wireless communication, and of devices configured to implement the methods.

Many cellular communication technologies provide a wide range of possible modulation and coding schemes and possible resource allocations, which potentially provides a cellular network with a great deal of granularity in selecting transport block size for each wireless device in the cellular network. In order to select a most efficient transport block size from among these options given a wireless device's current channel conditions, a wireless device may generally perform a relatively precise assessment of current channel conditions, generate relatively finely grained channel condition assessment results based on its assessment, and report those results to its serving base station.

In some instances, however, it may not be necessary to utilize the full range of transport block sizes to meet the needs of a wireless device. For example, for a wireless device whose application traffic has small, fixed payloads (e.g., many voice applications or machine type communications), only a limited number of modulation and coding schemes may realistically be considered for the wireless device by its serving base station. In such a case, very precise and granular channel condition assessment may be unnecessary, and so both device power consumption and network signaling overhead may be conserved by utilizing less precise and less granular channel condition assessment techniques.

Thus, according to the techniques described herein, a wireless device may select a channel condition assessment mode from at least two possible channel condition assessment modes, based at least in part on application traffic characteristics of an active application of the wireless device. For example, as one possibility, for an active application having an application traffic pattern which consistently includes small, fixed packet sizes, a channel condition assessment mode with relatively coarse precision and granularity of results may be used, while for an active application having an application traffic pattern which includes large and/or irregular packet sizes, a channel condition assessment mode with relatively fine precision and granularity of results may be used.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which:

FIGS. 6-7 illustrate exemplary possible modifications to channel condition assessment granularity based on application characteristics in the context of an exemplary transport block size table.

Figure 1:
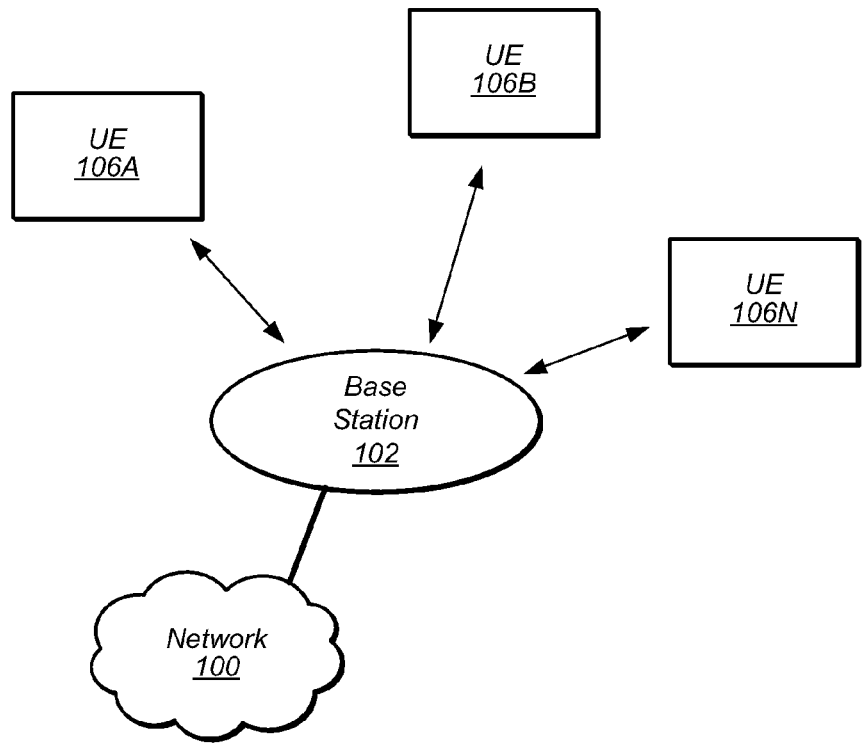
FIG. 1 illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices, laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, unicast/multicast/broadcast, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
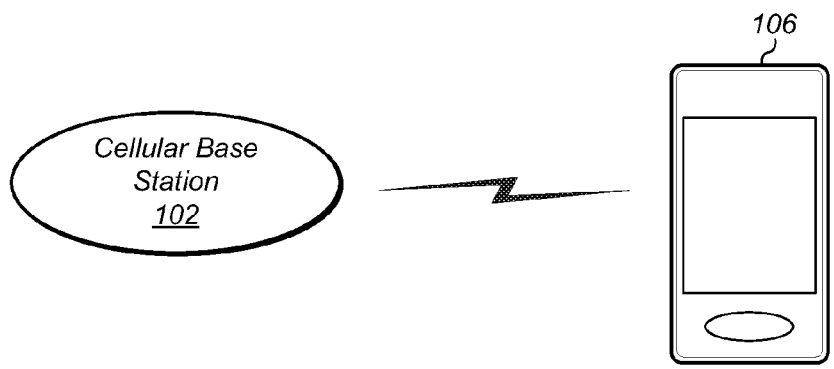
FIG. 2 illustrates a base station (BS) in communication with a user equipment (UE) device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices are referred to as UEs or UE devices.

The base station 102 may be a base transceiver station (BTS) or cell site (a "cellular base station"), and may include hardware that enables wireless communication with UEs 106 according to one or more cellular communication protocols. The UE 106 and the cellular base station 102 may communicate using any of various cellular communication technologies such as GSM, UMTS (WCDMA, TDS-CDMA), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice, SMS and/or data services.

A UE 106 may be capable of communicating using multiple wireless communication standards. For example, the UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TDS-CDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
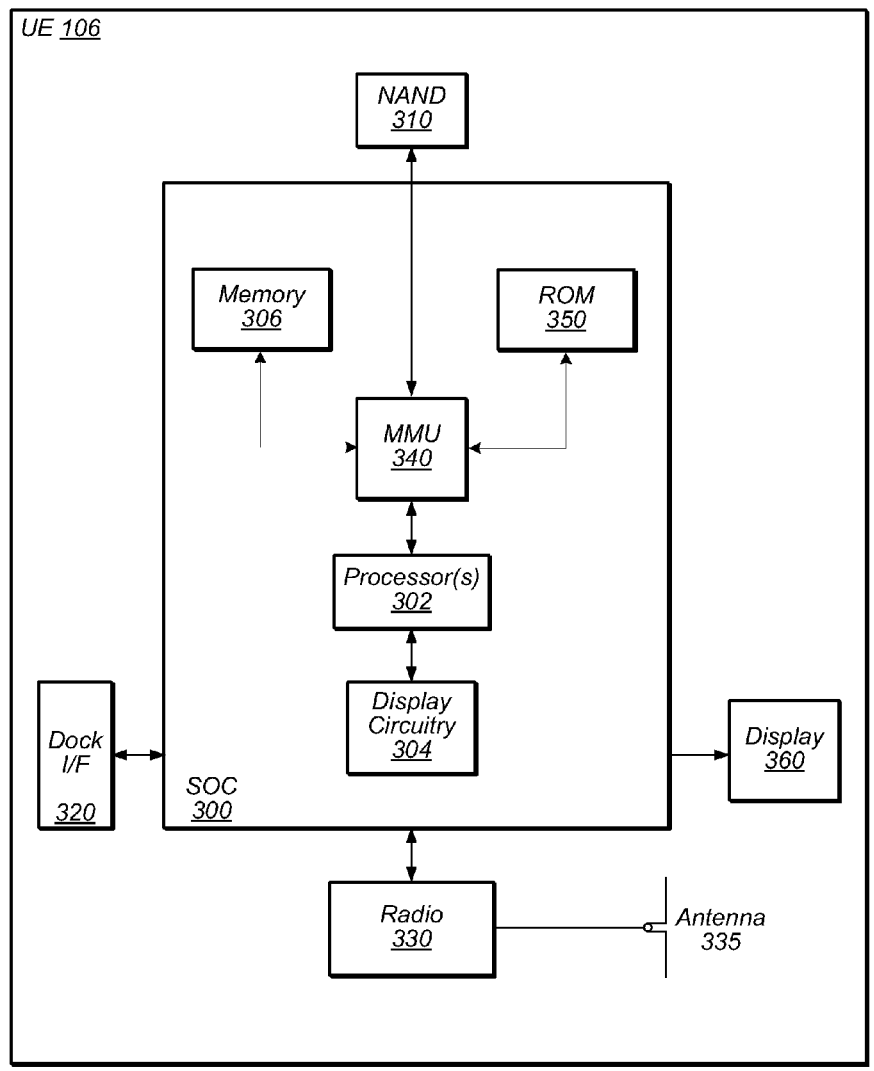
FIG. 3 illustrates an exemplary block diagram of a UE device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
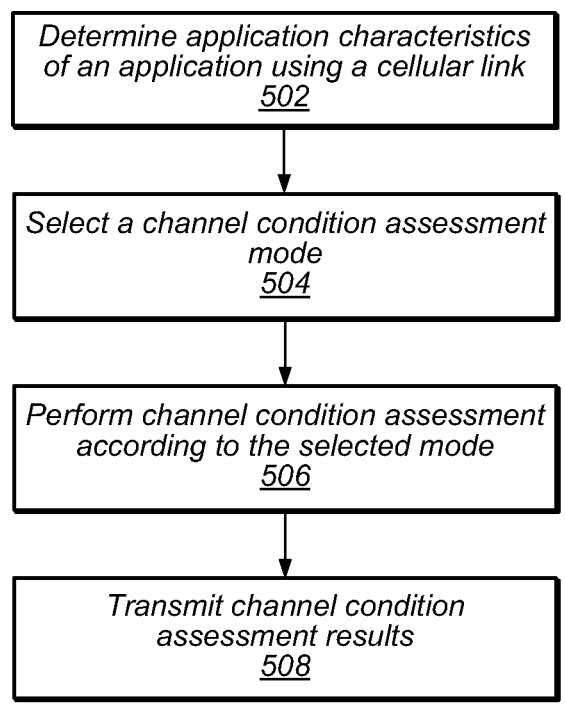
FIG. 5 is a flowchart diagram illustrating aspects of an application dependent technique for performing channel condition assessments.

As described herein, the UE 106 may include hardware and software components for implementing features for application dependent channel condition assessment mode selection, such as those described herein with reference to, inter alia, FIG. 5. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
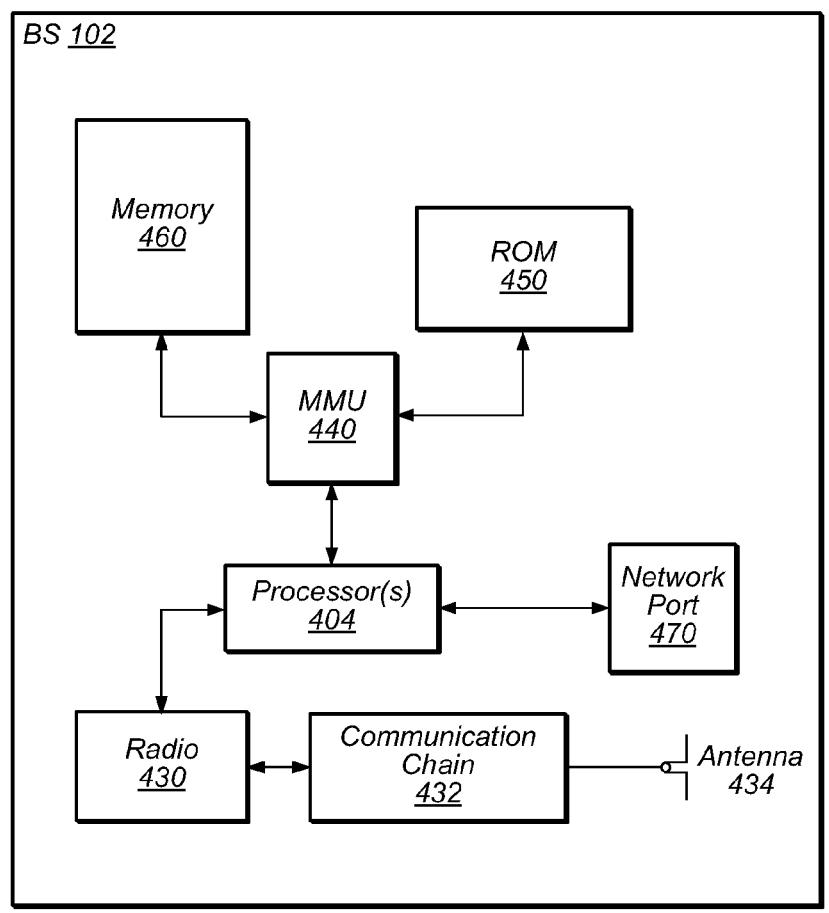
FIG. 4 illustrates an exemplary block diagram of a BS.

FIG. 4—Exemplary Block Diagram of a Base Station

FIG. 4 illustrates an exemplary block diagram of a cellular base station (BS) 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with respect to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, GSM, WCDMA, CDMA2000, Wi-Fi, etc.

The base station 102 may be configured to support power consumption efficient operation of a UE 106 in conjunction with cellular communication services. In particular, the BS 102 may include hardware and software components for implementing (or for use in conjunction with a UE 106 implementing) part or all of a method for application dependent channel condition assessment mode selection, such as the features described herein with reference to, inter alia, FIG. 5.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Cellular communication may be used by a variety of different applications. The characteristics of the various applications which may use cellular communication may differ greatly from one another. For example, some applications, such as high-definition real-time video chat or videoconferencing applications and certain gaming applications, may be relatively demanding with respect to bandwidth, latency, and other communication link characteristics. Other applications, such as bulk data transfers (e.g., file uploads/downloads), may be very flexible with respect to bandwidth demands/usage, and may not be particularly sensitive to link latency.

An increasingly important type of application which may utilize packet-switched cellular communication link may be the voice application. In particular, certain cellular technologies such as LTE and LTE-A are moving towards an all internet protocol (IP) infrastructure, in which voice over IP (VoIP) packet-switched communications are used for voice communications instead of circuit switched communications.

Voice applications may use any of a variety of codecs for compressing and decompressing voice data, including AMR-NB 12.2 kbps, AMR-WB 12.65 kbps, and many others. Given a particular codec, a voice application may typically utilize fixed (or approximately fixed) sized packets which may be communicated at regular (or approximately regular) intervals. Compared to many other applications which utilize cellular communication links, voice applications packets may be relatively small, and considering typical maximum cellular link capacity, voice applications may be relatively undemanding of network resources.

As another example, certain machine type communication (MTC) may generally include periodic, low data rate communication. Such communication, which might be used by process control devices, automation devices, measurement/monitoring devices such as thermometers, barometers, hydrometers, electricity meters, seismometers, etc., among various possibilities, may in many cases be relatively undemanding of network resources.

Given the differing characteristics of different types of applications which may use cellular links, it may be desirable to perform cellular communication in a manner which considers and makes use of these differing application characteristics in a manner that improves (reduces) UE and/or network power consumption and/or improves network efficiency.

FIG. 5 is a flowchart diagram illustrating one such method. In particular, FIG. 5 illustrates a method for a UE to select and implement a channel condition assessment mode in a manner that takes into consideration an application type and/or application characteristics of an application on the UE which is using its cellular link. The method shown in FIG. 5 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 502, the UE may determine application characteristics of an application using a cellular link of the UE. The application characteristics determined may include any of a variety of application traffic characteristics; for example, the application characteristics might include one or more of: typical transmission and/or reception frequency and/or regularity; typical packet size; and/or degree of packet size variation.

In some cases, application characteristics may be monitored/measured by the UE over a period of time. Alternatively, or in addition, application characteristics may in some cases be inferred from an application type of the application and/or a Quality of Service (QoS) Class Indicator (QCI) associated with an application. For example, it may be determined that the application is a voice (e.g., VoIP) application (e.g., for which QCI=1), and may thus be determined to have certain characteristics based on being a voice application. Determinations of (e.g., similar or different) application characteristics might likewise be made based on other application types (e.g., video chat applications, gaming applications, email and/or other productivity applications, streaming video applications, MTC applications, etc.) and/or QCI values.

In 504, a channel condition assessment mode may be selected. Any number, and any of a variety of types of channel condition assessment modes may be considered. As one example, for each possible channel quality assessment mode, a communication channel may be monitored for a different period of time, then measurements may be taken on one or more aspects of the communication channel (such as signal to noise ratio, among various possible measurements indicative of channel quality) based on the observations of the communication channel. In this example, the precision of the channel quality assessment may depend primarily on the length of time for which the channel is monitored.

The measurements may be formulated into a format expected by the BS. One such example of a channel quality assessment report may be a channel quality indicator (CQI) report. As one example, a standard CQI report might have a length of 4 bits, and might thus be quantized in a manner allowing up to 16 different CQI index values to be indicated to the base station. As a further and/or alternate variation on channel condition assessment modes, if less (or more) quantization is required, a CQI report having a shorter (or longer) length may be used. For example, a CQI report having 2 bits (e.g., 4 quanta) or 1 bit (e.g., 2 quanta) may be used if desired.

In some cases, different CQI report length/quantization may be used in combination with variable channel monitoring period. For example, as one channel assessment mode, a UE might begin monitoring the communication channel 4 ms before the CQI report is due, and might send a 4 bit CQI report based on monitoring for that length of time. As a second channel assessment mode, a UE might begin monitoring the communication channel 2 ms before the CQI report is due, and might send a 2 bit CQI report based on monitoring for that length of time. As a third channel assessment mode, a UE might begin monitoring the communication channel 1 ms before the CQI report is due, and might send a 1 bit CQI report based on monitoring for that length of time.

It should be noted that the channel assessment report may be used primarily (at least in some implementations) by the BS in determining a modulation and coding scheme (MCS) for the UE to receive in a subsequent downlink communication. The MCS selection may, in combination with an allocation of physical resource blocks (PRBs), effectively determine the transport block size with which the UE will receive that subsequent downlink communication.

Providing a precise channel condition assessment to the BS may accordingly provide the BS with knowledge of how high of an MCS could be supported by current channel conditions. This may in turn allow the BS to provide the highest MCS which will be supported by current channel conditions to a UE, potentially increasing channel efficiency. However, in certain cases, for example depending on application characteristics of an application using the cellular link, it may not be necessary to utilize as high as possible of an MCS, in which case the transport block size selected by the BS may be formed on the basis of a modulation and coding scheme which is sufficient to meet the requirements of the application, regardless of whether it may be more robust than required for current channel conditions.

For example, this may be the case if the application utilizes (e.g., with a predetermined degree of regularity and within a predetermined degree of variation) a packet size for downlink communication for which relatively modest MCS would provide a sufficiently large transport block size to accommodate the application packets. For example, a voice application or a MTC application might have such application characteristics.

For such an application (e.g., an application having an average packet size below a packet size threshold with a packet size variance below a packet size variance threshold), a high degree of precision in the UE's channel condition assessment may be unnecessary. For example, if it is recognized that a particular MCS index would be sufficient for the application's downlink communication, it may in turn be sufficient for the UE to provide a channel assessment report to the base station that indicates either 'yes' (or '1', for example, in a 1 bit report) (i.e., the channel conditions would support the particular MCS index) or 'no (or '0', for example, in a 1 bit report) (i.e., the channel conditions would not support the particular MCS index).

Thus, selection of a channel condition assessment mode may be based at least in part on application characteristics of an application using the cellular link of the UE. For example, a first (e.g., more precise and/or more granular) channel condition assessment mode may be used for a first type (or set of types) of application/an application having a first set of application characteristics or a first traffic pattern (e.g., irregular packet sizes and/or fixed packet size above a packet size threshold), while a second (e.g., less precise and/or less granular) channel condition assessment mode may be used for a second type (or set of types) of application/an application having a second set of application characteristics or a second traffic pattern (e.g., fixed packet size below the packet size threshold). Note that selection of a channel condition assessment mode may be made from any number of (e.g., two, as in the above example, or more than two, if desired) possible channel condition assessment modes. Further note that selection of a channel condition assessment mode may be made based on other considerations in addition to application type and/or characteristics, if desired.

In 506, channel condition assessment may be performed according to the selected channel condition assessment mode. Thus, if a more precise and/or more granular channel condition assessment mode is selected, the channel condition assessment may be performed in the more precise and/or more granular manner, while if a less precise and/or less granular channel condition assessment mode is selected, the channel condition assessment may be performed in the precise and/or less granular manner.

Note that utilizing application dependent channel condition assessment mode selection, and performing channel condition assessment on that basis, may advantageously reduce power consumption by the UE without significantly negatively affecting performance of the UE or the network as a whole. In particular, by recognizing that certain applications and/or applications having certain characteristics (e.g., consistently small, relatively fixed size, and possibly also highly regular communication intervals) may not require as precise and/or as granular of channel condition assessments as other applications in order to provide satisfactory performance, quicker channel assessments may be made, which may reduce power consumption by reducing the amount of time the UE needs to be awake and monitoring the communication channel, and/or a shorter channel condition assessment report may be provided to the base station, which may reduce the need for uplink control resources (e.g., may conserve signaling capability). Likewise, when finer-grained and/or more precise channel condition assessments are appropriate (e.g., to efficiently use the spectrum, for example for large and/or variable-sized data payloads), appropriately precise and fine-grained channel condition assessments may be performed to take advantage of the full range of possible MCS levels and PRB allocations.

In 508, channel condition assessment results obtained from performing the channel condition assessment may be transmitted to the BS from the UE via the cellular link. As noted above, the channel condition assessment results may be used by the BS to for at least part of the basis for selection of a transport block size to be used for a subsequent downlink communication to the UE. The BS may then indicate the selected transport block size (and any other communication parameters, such as a HARQ Process ID) to the UE, and may then perform a subsequent downlink communication according to the selected transport block size (and any other communication parameters), including downlink communication on behalf of the application using the cellular link with the UE.

Note that the method of FIG. 5 may be repeated any number of times (e.g., may be part of a recurring control loop), if desired.

FIGS. 6-7

Figure 6:
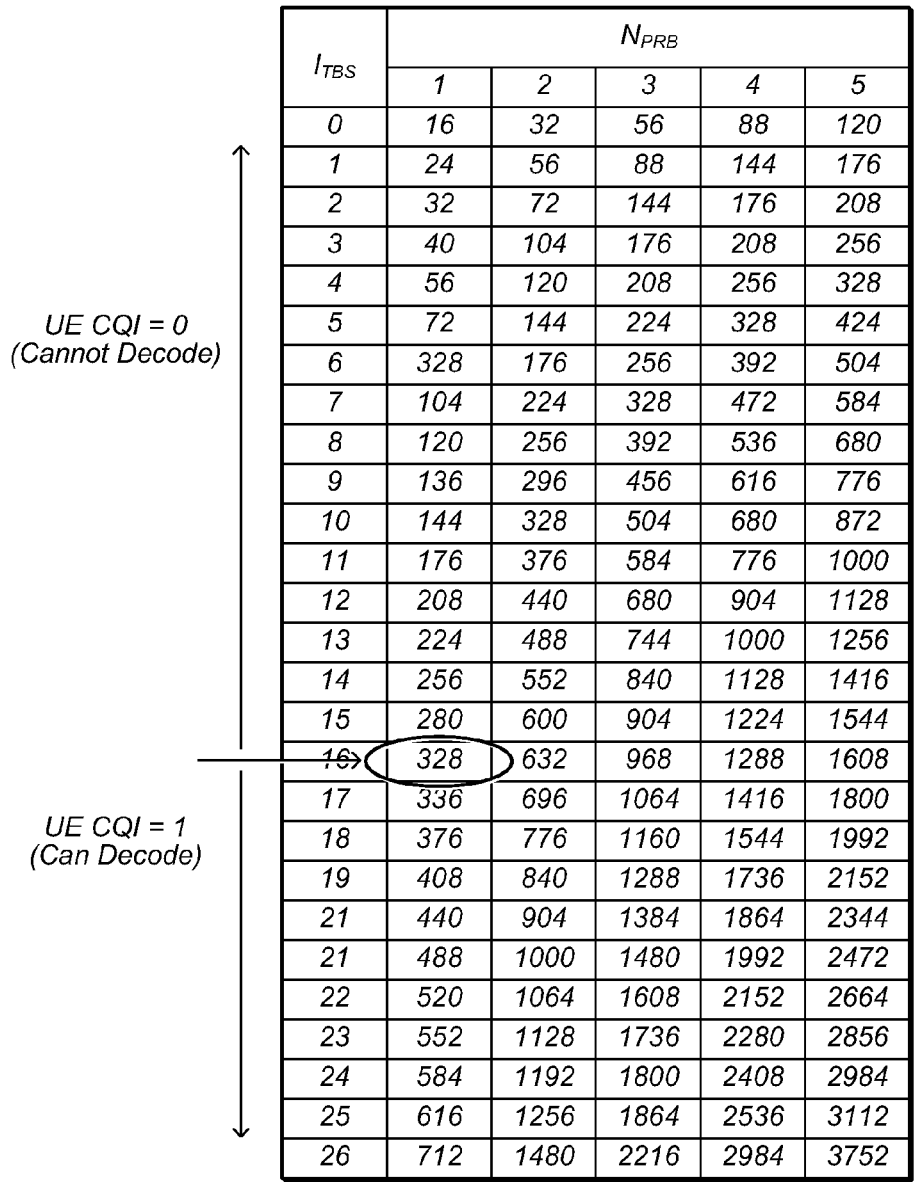

FIGS. 6-7 illustrate an exemplary TBS table which may be used in conjunction with cellular communication systems, including such systems in which the method illustrated in and described with respect to FIG. 5 might be implemented. Note that while FIGS. 6-7 and the corresponding description thereof are provided for illustrative purposes, this information is provided by way of example only, and is not intended to be limiting to the disclosure as a whole.

The table illustrated in FIGS. 6-7 may be used to illustrate exemplary alternate channel condition assessment (e.g., CQI) report formats which may be used, depending on application characteristics of an application utilizing the cellular link, as desired.

As shown, the table illustrated in FIGS. 6-7 indicates transport block sizes resulting from various combinations of TBS indices (which may be correlated or identical to MCS indices) and numbers of physical resource blocks assigned to a UE. As shown, the transport block sizes may generally increase with both TBS index ($I_{TBS}$) and with number of PRBS assigned ($N_{PRB}$).

Consider a scenario in which a voice (e.g., VoIP) application typically utilizes packets which comfortably fit in an $I_{TBS}$ of 16 in a single PRB. For such an application, it may not matter particularly to the BS whether channel conditions could support an $I_{TBS}$ of 20 or 25: in either case, the BS may simply select an $I_{TBS}$ of 16. In other words, the BS may not need a very granular CQI report; for example, as shown in FIG. 6, it might be sufficient to define a CQI of 1 as indicating that an $I_{TBS}$ of 16 or higher can be supported, and to define a CQI of 0 as indicating that an $I_{TBS}$ of 16 or higher cannot be supported. When appropriate, such a channel condition assessment mode may provide the base station with sufficient information to determine whether the UE is in good enough conditions to decode a transport block with an $I_{TBS}$ of 16, while allowing the UE to perform and signal a coarser CQI measurement, for example taking approximately 1 ms to perform the CQI measurement and signaling a 1 bit CQI report instead of taking approximately 4 ms to perform the CQI measurement and signaling a 4 bit CQI report in a 'normal' CQI measurement.

The exemplary scenario of FIG. 6, in which a 1 bit CQI report may be sufficient, may be appropriate in many circumstances. For example, the exemplary scenario of FIG. 6 may be suitable if an $N_{PRB}$ of 1 is assigned (or expected to be assigned, e.g., based on recent experience). However, in other circumstances, or simply as another option, it may be desirable to define a CQI report/CQI measurement mode with slightly more granularity (and possibly precision, as well). For example, as shown in FIG. 7, the BS may be targeting an $I_{TBS}$ of 10 in combination with an $N_{PRB}$ of 2 (which may provide a TBS equivalent to an $I_{TBS}$ of 16 in combination with an $N_{PRB}$ of 1). In this case, it may be helpful to the BS to provide slightly more granularity in the CQI report; for example, as shown, 4 CQI quanta (e.g., a 2 bit CQI report) may be defined. Such a degree of quantization could provide representation of very poor channel conditions (e.g., CQI=0), in which no number of PRBs would be sufficient to support a TBS of 328 bits, somewhat poor channel conditions (e.g., CQI=1), in which a TBS of 328 bits could be supported, but only using a greater number of PRBs than 2, good channel conditions (e.g., CQI=3), in which the target TBS of 328 bits can be achieved using an $N_{PRB}$ of 2, and very good channel conditions (e.g., CQI=4) in which the target TBS of 328 bits could be achieved using an $N_{PRB}$ of 1. This may help provide the base station with more information with respect to how to allocate UE resources (e.g., whether to allocate fewer or more PRBs) relative to the example of FIG. 6, while still allowing the UE to perform and signal a coarser CQI measurement, for example taking approximately 2 ms to perform the CQI measurement and signaling a 2 bit CQI report instead of taking approximately 4 ms to perform the CQI measurement and signaling a 4 bit CQI report in a 'normal' CQI measurement.

Note that while the illustrated alternate ways of quantizing the TBS table illustrated in FIGS. 6-7 represent two possible ways to define CQI reports having a granularity of less than 4 bits, any number of further alternate ways are also possible, and may be used if desired.

Control Loop

Many cellular communication systems utilize a control loop. For example, the method illustrated in and described with respect to FIG. 5 might be implemented in a cellular communication system in which a control loop is used. The following description provides certain exemplary details of one such control loop which might be used in conjunction with the method of FIG. 5. Note that while the following information is provided for illustrative purposes of certain exemplary details which may be used in some implementations, this information is provided by way of example only, and is not intended to be limiting to the disclosure as a whole.

In a control loop between a UE and a BS, a UE may gather certain information (such as information relating to channel conditions) and transmit that information to the base station. The base station may consider that information and, in combination and coordination with various other network elements (e.g., other UEs in the system) and considerations, indicate back to the UE certain characteristics which the UE should use for its communications with the base station for a subsequent period of time.

As noted above, among the information gathered by the UE may be information relating to channel conditions. For example, the UE may perform a channel quality assessment in which a communication channel is monitored for a period of time, measurements are taken on one or more aspects of the communication channel (such as signal to noise ratio, among various possible measurements indicative of channel quality), and formulated into a format expected by the BS. One such example of a channel quality assessment report may be a channel quality indicator (CQI) report.

Among the characteristics of downlink communication to a UE which a BS may determine based on information (such as CQI reports) provided by the UE may be a modulation and coding scheme (MCS). Higher MCSs may provide greater throughput, but each incremental higher MCS may require incrementally better channel conditions to support the MCS without resulting in excessive error rates and packet losses. Said another way, each possible MCS may have a different robustness, and so each may be suitable only up to a certain degree of channel condition quality.

Thus, MCS selection may be at least partially dependent on channel conditions. For example, if a given MCS is used in worse channel conditions than it is suited for, it may result in excessive packet loss and thus inefficient and possibly ineffective communication. Accordingly, except when channel conditions are sufficiently good that all MCS schemes (e.g., as defined according to a given cellular standard) would be suitable, only a (e.g., more robust) subset of possible MCSs may effectively be available to choose from at any given time. In many cases, a CQI report may include a CQI index value which may be mapped to a specific MCS index value by the BS. That MCS index may represent the maximum suitable MCS for the channel conditions represented by that CQI index.

Another characteristic of downlink communication to a UE which a BS may determine may include a physical resource block (PRB) assignment. This may correspond to the amount of network resources (e.g., amount of channel bandwidth) allotted to a UE for a given downlink communication to the UE. Thus, a greater number of PRBs assigned to a UE may correspond to a greater throughput capacity being provided to the UE. Taken together, the number of PRBs and the MCS assigned to a UE may define its downlink transport block size (TBS), or the maximum amount of data that may be communicated to the UE in a given transport interval.

Once the various characteristics of downlink communication to the UE have been determined, the BS may indicate these characteristics to the UE (e.g., by way of a downlink communication, typically on a control channel). The UE may then prepare for and execute (e.g., receive and decode) subsequent downlink communication with the BS according to the indicated characteristics.

The UE and the BS may repeat execution of such a control loop over the course of time during which they are in communication, in order to adjust communication characteristics to meet changing conditions (e.g., application traffic, channel conditions, network saturation, etc.).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
a radio;
a processing element operably coupled to the radio;
wherein the radio and the processing element are configured to:
select a channel condition assessment mode for assessing a wireless communication channel used for a cellular link from at least two channel condition assessment modes comprising a first channel condition assessment mode and a second channel condition assessment mode, wherein the channel condition assessment mode is selected based at least in part on application traffic patterns of traffic generated by an application executing on the UE device using the cellular link, wherein the first channel condition assessment mode is selected for application traffic having an average packet size above a packet size threshold or a packet size variance above a packet size variance threshold, wherein the second channel condition assessment mode is selected for application traffic having an average packet size below the packet size threshold and a packet size variance below the packet size variance threshold;
perform channel condition assessment according to the selected channel condition assessment mode; and
transmit channel condition assessment results obtained from performing the channel condition assessment to a cellular base station via the cellular link.

2. The UE of claim 1,
wherein the radio and the processing element are configured to select a first channel condition assessment mode for application traffic having a fixed packet size below a packet size threshold, wherein the radio and the processing element are configured to select a second channel condition assessment mode for application traffic having irregular packet sizes.

3. The UE of claim 1,
wherein a first channel condition assessment mode comprises monitoring the wireless communication channel for a first length of time, wherein a second channel condition assessment mode comprises monitoring the wireless communication channel for a second length of time.

4. The UE of claim 1,
wherein a first channel condition assessment mode comprises generating channel condition assessment results with a first degree of granularity, wherein a second channel condition assessment mode comprises generating channel condition assessment results with a second degree of granularity.

5. The UE of claim 1,
wherein the application traffic patterns of traffic generated by the application comprise application traffic regularity, application traffic average packet size, or degree of application traffic packet size variation.

6. The UE of claim 1, wherein the UE is further configured to:
determine the application traffic patterns of traffic generated by the application based at least in part on a Quality of Service Class Indicator (QCI) value associated with traffic generated by the application.

7. The UE of claim 1,
wherein the channel condition assessment results comprise a channel quality indicator (CQI) value.

8. A method for a wireless user equipment (UE) device to reduce power consumption in conjunction with cellular communications, the method comprising:
determining one or more application traffic patterns of traffic generated by an application executing on the UE which is using a cellular communication link of the UE, wherein the one or more application traffic patterns comprise average packet size and packet size variance;
selecting a channel condition assessment mode for assessing a wireless communication channel used for the cellular communication link from at least a first channel condition assessment mode and a second channel condition assessment mode, wherein the channel condition assessment mode is selected based at least in part on the determined one or more application traffic patterns, wherein the first channel condition assessment mode is selected for application traffic having an average packet size above a packet size threshold or a packet size variance above a packet size variance threshold, wherein the second channel condition assessment mode is selected for application traffic having an average packet size below the packet size threshold and a packet size variance below the packet size variance threshold;
performing channel condition assessment according to the selected channel condition assessment mode; and
transmitting channel condition assessment results obtained from performing the channel condition assessment to a cellular base station via the cellular communication link.

9. The method of claim 8, further comprising:
determining the one or more application traffic patterns based at least in part on a Quality of Service Class Indicator (QCI) value associated with traffic generated by the application.

10. The method of claim 8,
wherein the first channel condition assessment mode provides a higher precision channel condition assessment than the second channel condition assessment mode.

11. The method of claim 10,
wherein the first channel condition assessment mode provides a higher precision channel condition assessment than the second channel condition assessment mode by monitoring the wireless communication channel for a greater length of time than the second channel condition assessment mode.

12. The method of claim 8,
wherein the first channel condition assessment mode generates finer granularity channel condition assessment results than the second channel condition assessment mode.

13. The method of claim 8,
wherein the channel condition assessment results comprise channel quality indicator (CQI) values,
wherein the first channel condition assessment mode generates four bit CQI values,
wherein the second channel condition assessment mode generates less than four bit CQI values.

14. The method of claim 8, the method further comprising:
receiving a transport block assignment from the cellular base station via the cellular communication link, wherein the transport block assignment is based at least in part on the channel condition assessment results.

15. A non-transitory computer accessible memory medium comprising program instructions for a wireless user equipment (UE) device reduce power consumption in conjunction with cellular communications, wherein when executed, the program instructions cause the UE to:
select a channel condition assessment mode for assessing a wireless communication channel used for a cellular link from at least a first channel condition assessment mode and a second channel condition assessment mode, wherein the first channel condition assessment mode more precisely measures channel conditions and generates more finely grained channel condition assessment results than the second channel condition assessment mode, wherein the first channel condition assessment mode is selected for application traffic of a first one or more applications executing on the UE device having a first application traffic pattern, wherein the second channel condition assessment mode is selected for application traffic of a second one or more applications executing on the UE device having a second application traffic pattern, wherein the first channel condition assessment mode is selected for application traffic having an average packet size above a packet size threshold or a packet size variance above a packet size variance threshold, wherein the second channel condition assessment mode is selected for application traffic having an average packet size below the packet size threshold and a packet size variance below the packet size variance threshold;
perform channel condition assessment according to the selected channel condition assessment mode; and
transmit channel condition assessment results obtained from performing the channel condition assessment to a cellular base station via the cellular link.

16. The memory medium of claim 15,
wherein the first channel condition assessment mode achieves more precise channel condition measurement by monitoring the wireless communication channel for a greater length of time than the first channel condition assessment mode.

17. The memory medium of claim 15, wherein when executed, the program instructions further cause the UE to:
receive an indication of a selected transport block size from the cellular base station via the cellular link, wherein the transport block size is selected by the cellular base station based at least in part on the channel condition assessment results; and
receive a downlink communication from the cellular base station via the cellular link according to the selected transport block size.

18. The memory medium of claim 15, wherein when executed, the program instructions further cause the UE to:
perform said selecting, performing, and transmitting in a repeating manner as part of a recurring cellular communication control loop.

* * * * *